United States Patent
Raghavendran et al.

(10) Patent No.: US 8,782,216 B2
(45) Date of Patent: Jul. 15, 2014

(54) QUANTITATIVE MANAGEMENT ASSESSMENTS OF DATA COMMUNICATION NETWORKS WITH CONVERGED ARCHITECTURES

(75) Inventors: Vijayakumar Raghavendran, Cary, NC (US); Balbir Sanjay Pal, Cary, NC (US); Saad Hasan, Cary, NC (US); Sandeep Dhingra, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 277 days.

(21) Appl. No.: 13/194,159

(22) Filed: Jul. 29, 2011

(65) Prior Publication Data

US 2013/0031242 A1   Jan. 31, 2013

(51) Int. Cl.
   *G06F 15/173*   (2006.01)
(52) U.S. Cl.
   USPC ............................ 709/224; 709/217; 709/223
(58) Field of Classification Search
   CPC ....... H04L 41/147; H04L 43/08; H04L 43/04; H04L 67/22
   USPC .......................................... 709/217, 223, 224
   See application file for complete search history.

(56) References Cited

U.S. PATENT DOCUMENTS

| 6,751,662 | B1* | 6/2004 | Natarajan et al. ............. 709/223 |
| 7,240,213 | B1* | 7/2007 | Ritter ............................ 713/182 |
| 7,805,518 | B1* | 9/2010 | Kamvar et al. ................ 709/227 |
| 7,983,161 | B2* | 7/2011 | Fraccalvieri et al. ....... 370/230.1 |
| 2002/0152305 | A1* | 10/2002 | Jackson et al. ................ 709/224 |
| 2007/0070969 | A1 | 3/2007 | Malomsoky et al. |
| 2008/0052394 | A1* | 2/2008 | Bugenhagen et al. ........ 709/224 |
| 2008/0320123 | A1* | 12/2008 | Houlihan et al. ............. 709/224 |
| 2009/0047977 | A1 | 2/2009 | Malomsoky et al. |
| 2009/0222555 | A1* | 9/2009 | Qian et al. ..................... 709/224 |
| 2010/0077077 | A1 | 3/2010 | Devitt |
| 2011/0055287 | A1* | 3/2011 | Sun et al. ...................... 707/805 |

OTHER PUBLICATIONS

CA Ehealth, "Proactively Manage IT Service Performance Across Your Enterprise with CA eHealth Network Performance Manager", dated 2008, 16 pages.

* cited by examiner

*Primary Examiner* — Phuoc Nguyen
(74) *Attorney, Agent, or Firm* — Hickman Palermo Truong Becker Bingham Wong LLLP

(57) ABSTRACT

Techniques for quantitative converged network assessment are described. Performance information, associated with network infrastructure elements and application or service elements of a computer network, is received. One or more key performance indicators of a reference network architecture are compared with at least a portion of the performance information. A plurality of first scores is determined based on the comparison of the one or more key performance indicators and at least a portion of the performance information. Based on the plurality of first scores, a single second score is determined that indicates a converged state of the computer network with respect to the reference network architecture.

20 Claims, 9 Drawing Sheets

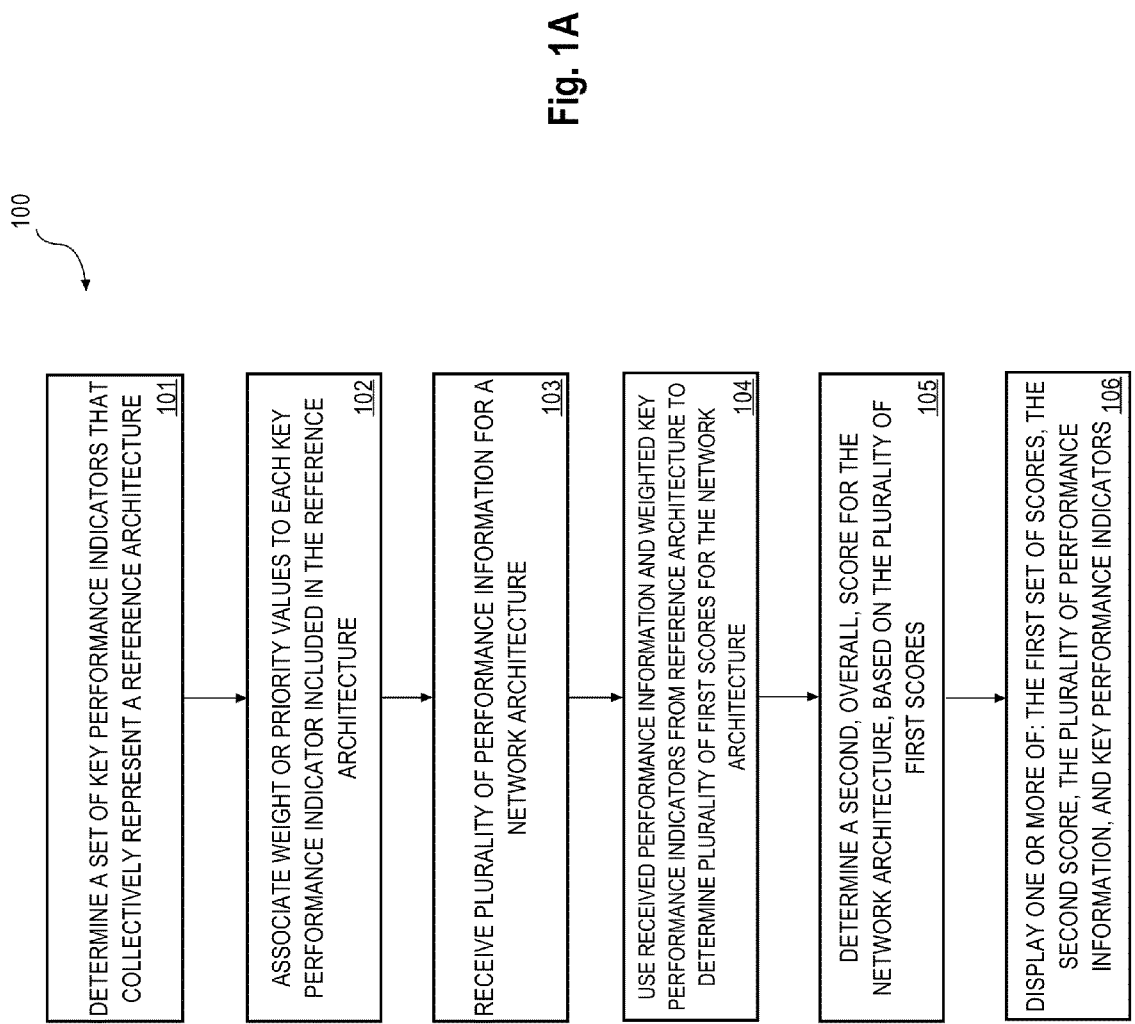

| Infrastructure/Network KPI | Description | Examples |
|---|---|---|
| Business Priority | Covers the business priority of the infrastructure or applications. | CxO or Biz lead sites, Manufacturing plant etc |
| Flexibility/Modularity | Hierarchical layers and modularity gives ability to segment the network. | Core, Distribution and Access layers with different devices placements etc |
| Availability | Network and Device Availability. | This may be based on Service Level Agreement |
| QoS/SLA | Classification, Marking, shaping, policing across each module. These differentiated CoS is required for meeting SLAs. | Edge WAN marking, shaping and contractual SLA with a Service Provider |
| Secure Infrastructure | Infrastructure Security Principles and IMs role in Security metrics using collate, harden, isolate etc | ACLs, AAA, IPSec, Firewall, SSH access to devices, etc.. |
| Operational Readiness | Operational architecture framework based on ITIL on Release, Config, capacity, performance management readiness | Failure reporting, anomaly logging, IP Management, Systems Monitoring, etc… |
| Standards Adherence/Governance | Consistent and cohesive policies, processes, and guidance on Architecture, planning, deploying, and operating the network and its components. | Architecture, Configuration Management, Security Policies, Hardware deployment models, Software Version adoption, etc… |
| Routing/Layer 2 Design Principle | Covers the Layer 2 and Layer 3 design aspects in relation to network protocols and their subcomponents based on Best Practice guidelines. Areas, summarization etc | EGP, IGP, STP, BFD, etc… |
| Scalability | The ability for the network to handle increasing demand as well as its ability to easily grow to meet such demands. | Routing table size, broadcast domain minimization, virtualization techniques, bandwidth utilization, etc… |
| Resiliency | The networks ability to continue to provide its services at an acceptable level during various hardware and/or software failures. | Disaster Recovery, Convergence tuning, etc.. |
| Compliance | The ability for the network to be in line with established guidelines, specifications, or legislation. This also covers the HW/SW recommended complaince | HIPPA, SOX, GLB, as well as the actual adoption of the principles set forth within the Standards Adherence/Governance KPI |
| Robustness | The networks ability to support critical traffic during any stress related condition. | PfR to support VoIP during any failure scenario. NSF/SSO. Source based black hole filtering, Reverse Path Forwarding, Rate limiting, CoPP, etc… |
| Sustainability/Green | The sustainability or Green initiative mandated by many customer compliance | Power Saving Technique, Link reduction, device reduction etc. |

Fig. 3

| KPI Category | Sub-Category | Question | Level of Importance | Answer | Notes |
|---|---|---|---|---|---|
| Modularity | General Architecture | Do you have clearly defined single/unique role for devices found within the Site? | 50 | Yes | |
| | Routing Protocol | Do you have a BGP boundary with the other layers of the network for this Site? | 50 | No | |
| Availability | Transport | Are there dual uplinks to the core/provider(s)? | 50 | Yes | |
| | Transport | Do you utilize multiple providers? | 50 | Yes | |
| | Transport | Are the uplinks to the core/provider(s) oversubscribed in case of failure of an uplink? | 50 | Yes | |
| | Transport | Do you use legacy uplink types such as ISDN or general ISP paths for data transport versus a dedicated transport model like MPLS VPN's or SDH? | 50 | Yes | |
| | Hardware | Are there redundant termination routers for uplinks to the core/provider(s)? | 50 | No | |
| | Hardware | Are there redundant modules for the uplinks to the | 50 | Yes | |

(continued from FIG. 5A)

| | | | | | |
|---|---|---|---|---|---|
| Security | Routing | Are you utilizing up-to-date bogon lists for filtering at the Edge? | 20 | Yes | |
| | Routing | Are you utilizing a maximum-prefix filter with your Provider Edge? | 20 | Yes | |
| Operational Readiness | Management | Are you running IPSLA for synthetic network metric measurement? | 20 | No | |
| | Management | Are you receiving fault incidence reports for this Site? | 20 | No | |
| Governance | Routing | Do you currently use common standards within your WAN configurations for routing? | 20 | Yes | |
| | QoS | Do you currently use common standards based configuration within your WAN configurations for QoS? | 20 | Yes | |

Fig. 5B

| | Business Priority | Modularity | Availability | Quality of Service | Operational Readiness | Governance | ... | Sustainability | Overall Architecture Score |
|---|---|---|---|---|---|---|---|---|---|
| Weight/Level of Importance | 50 | 50 | 50 | 20 | 20 | 5 | | 5 | |
| KPI Percentage Grades | 100 | 100 | 100 | 50 | 100 | 100 | | 0 | 190 |

601 — (Business Priority, Modularity, Availability)
602 — (Quality of Service, Operational Readiness)
603 — (Governance, ..., Sustainability)

Fig. 6

QUANTITATIVE MANAGEMENT ASSESSMENTS OF DATA COMMUNICATION NETWORKS WITH CONVERGED ARCHITECTURES

FIELD OF THE INVENTION

The present disclosure generally relates to network management, and more specifically relates to techniques for assessing whether the performance of data communications networks is sufficient to implement converged architectures.

BACKGROUND

Computer networks are typically comprised of numerous software applications or services and physical infrastructure elements. The arrangement or "architecture" for a computer network's components and their functional organization largely differ depending on the purpose of the network. However, computer network architectures may be required or heavily pressured to change to meet the demands of new technologies or markets. One common trend in changing network architectures involves a transformation from a traditional, single function, computer network to a converged network capable of performing a vast array of services and having the infrastructure to support such services. For example, emerging networks are expected to carry data, voice, video, and other traffic types easily and efficiently. Additionally, there are enormous efficiency and reliability incentives to converge or unify traditional networks into converged network architectures for future application and service deployments.

Considering this need for change, network administrators and managers have new needs to assess the existing state of a network and the network's readiness to adapt to new applications, services, and physical infrastructure. Existing network architecture assessments operate on individual applications or technologies within a given architecture and thus fail to provide any indication of how individual applications and services impact a network as a whole. Moreover, existing remedial recommendations are highly subjective and therefore challenging to track, trend and analyze.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates one example of a method for assessing a computer network.

FIG. 3 illustrates one example of infrastructure-related key performance indicators.

FIG. 5A illustrates one example of key performance indicators and corresponding weight values.

FIG. 5B illustrates one example of key performance indicators and corresponding weight values.

FIG. 6 illustrates one example of scores for a set of key performance indicators.

DESCRIPTION OF EXAMPLE EMBODIMENTS

Figure 1B:
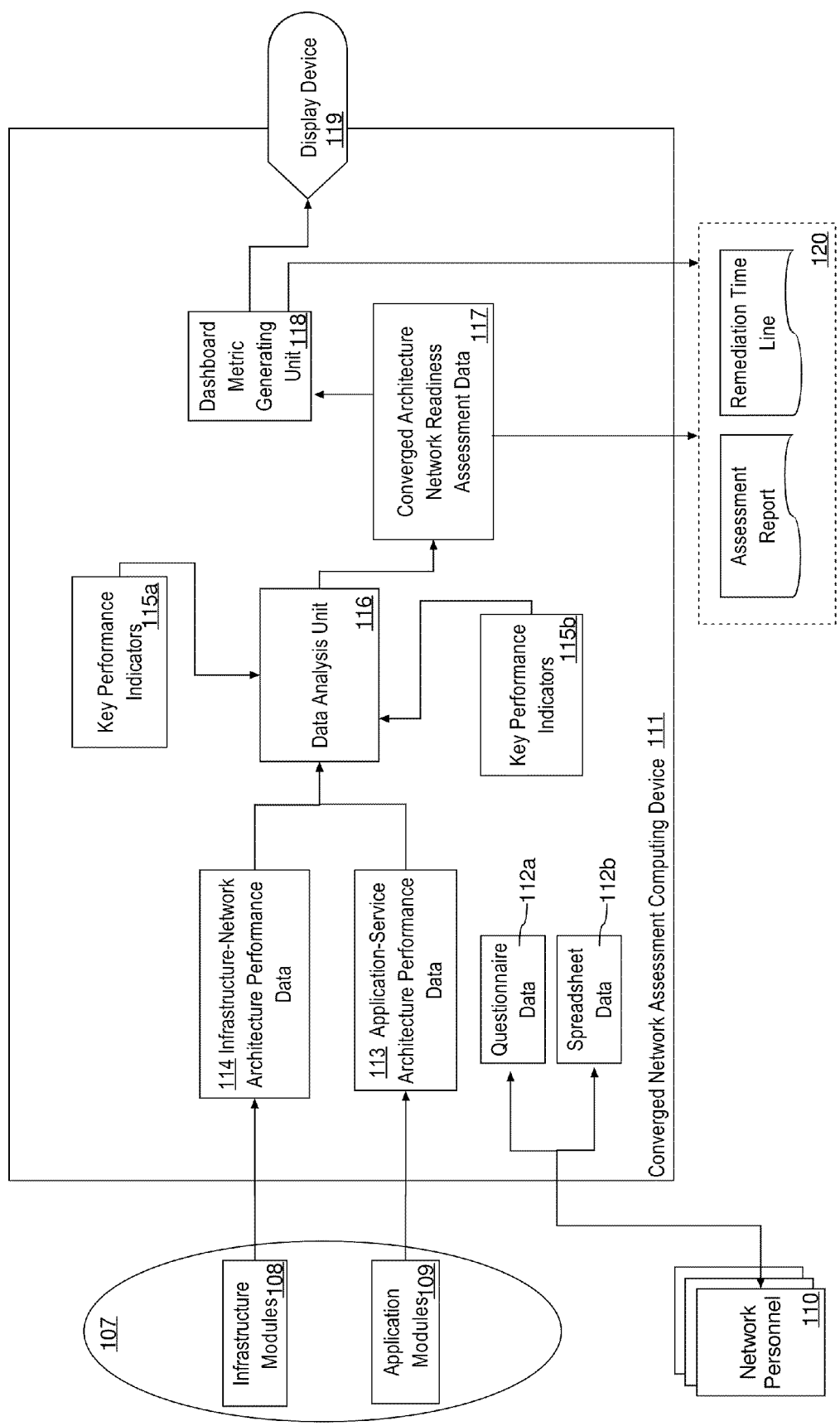
FIG. 1B illustrates one example of a converged network assessment computing device.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In one embodiment, a method for assessing a network architecture comprises receiving performance information associated with performance of one or more network infrastructure elements and one or more application elements or service elements of the computer network. At least a portion of the received performance information is compared to one or more key performance indicators of a reference network architecture. In one embodiment, key performance indicators include one or more application layer network readiness criteria and one or more physical network infrastructure readiness criteria. A plurality of first scores for the performance information are determined based on the comparison and a single second score is determined based on the plurality of first scores. The single score indicates a converged state of the computer network with respect to the reference architecture.

In another embodiment, a graphical user interface is used to display at least a portion of the plurality of first scores, and at least a portion of the performance information. Further embodiments including a graphical user interface may include displaying at least a portion of each of the plurality of first scores, the single second score, the performance information, and key performance indicators. Even further embodiments including a graphical user interface may include displaying the plurality of first scores and/or the single second score by geographic region or site location associated with the network.

In another embodiment, weight values are associated with each key performance indicator. Each score of the plurality of first scores is based, at least in part, on a particular weight value associated with a particular key performance indicator. In another embodiment, weight values indicate priority levels or level of importance for key performance indicators and at least a portion of the plurality of first scores are displayed according to priority level or level of importance.

In another embodiment, generating a single overall score for an existing network includes classifying the computer network into a category or grade that indicates an ability of the computer network to support a particular set of network applications, services or infrastructure elements.

In another embodiment, remediation report data is generated based at least in part on the plurality of first scores and the single second score. Remediation report data may indicate, for example, how an existing computer network could be modified to match key performance indicators.

In one embodiment, a plurality of second performance information associated with the performance of a second, current network architecture is received. Thus the second network may comprise, in comparison to the reference network, another particular network or architecture for which a performance assessment is desired. At least a portion of the second received performance information is compared to one or more key performance indicators of a reference network architecture. A plurality of second scores for the second performance information is determined based on the comparison and a single third score is determined based on the plurality of second scores. The single third score indicates a converged state of the computer network with respect to the reference architecture. In various embodiments, the scores associated with the first and second performance information are displayed in a graphical user interface for comparison.

Example Embodiments

Assessing Network Readiness

FIG. 1A illustrates one example of a method 100 for assessing a computer network. In one embodiment, a computer network which serves as the subject of assessment (also referred to herein as an "existing network") is itself a converged network including infrastructure elements and applications or services of a computer network that have been traditionally independent of one another. For example, a converged network may include physical infrastructure and applications that support a wide variety services such as packet switched data communication, location-based services, voice over IP, digital video broadcasting, etc. However, in other embodiments, an existing network under assessment may be a traditional, non-converged, network comprised of a network having infrastructure and applications supporting only one function, such as voice. In either case, the method 100 described herein provides a mechanism to evaluate the ability of an existing network to support integrated network services and applications based on objective criteria, using converged network principles.

Although the method 100 as described herein relates to assessing an existing or current state of a network with respect to a reference architecture, the method 100 is not limited to existing network embodiments. The method 100 can also be applied to, for example, a proposed transformative state of a network or even a previous state of a computer network.

Generating Key Performance Indicators

In step 101 of FIG. 1A, a set of key performance indicators (KPIs) is determined. In one embodiment, determining the readiness of an existing network to perform converged network services entails comparing a specific set of KPIs with performance information of an existing network. KPIs represent a reference network architecture by defining the applications and infrastructure elements used for comparison with an existing network. In one embodiment, KPIs define the various elements of a converged network based on best practice principles associated with an efficient, scalable and robust converged network. KPIs associated with business principles may also be used. For example, KPIs related to sustainability, business priority, cost efficiency, and regulatory compliance may be determined. The term "key performance indicator" is merely a label for any of several kinds of reference performance indicators and the term "key" is not intended to connote a requirement for information that has been deemed as critical, essential, or otherwise important by a particular person, enterprise standard, or group. The alternative term "reference performance indicator" is equally suitable for labeling the same concept.

As described in detail below, grouping KPIs based on the impact of a KPI on specific aspect of end-to-end architecture, such as application-, physical infrastructure-, or business-related impact, facilitates detailed analysis of an existing network's readiness with respect to the KPIs. Thus, selected KPIs may be grouped in a particular group based on the specific impact of those KPIs on end-to-end application performance, physical infrastructure, business issues, etc. Further, grouping KPIs aids in identifying deficiencies of an existing network and provide greater flexibility in generating recommendations or roadmap strategy for improving an existing network.

Figure 4:
FIG. 4 illustrates one example of application-related key performance indicators.

FIGS. 3 and 4 FIG. illustrate example sets of KPIs 300, 400 for application and network infrastructure elements, respectively. In FIG. 3, column 301 indicates an identifier for each infrastructure-related KPI. Descriptions in column 302 indicate how each corresponding infrastructure KPI is applied to an existing network. For example, the Robustness infrastructure KPI may be used to verify a given network's ability to support critical traffic during stress-related conditions. Examples column 303 gives examples of the infrastructure elements used to assess a given network for a particular KPI and per a corresponding description 302.

Depending on the type of reference architecture desired for comparison with an existing network, the same general KPI identifiers (column 401) may also apply to application-related KPIs. This is the case regarding the example embodiment of FIG. 4, however, description column 402 and examples column 403 include descriptions and examples that are relevant to applications and services, rather than infrastructure elements.

The KPIs depicted in FIG. 3 and FIG. 4 are examples that are provided solely to illustrate clear embodiments, but other embodiments may include any number of different sets of KPIs. Further, a set of KPIs may be periodically updated to correspond with the current state-of-the-art for a particular reference architecture. The method 100 as described herein may include a reference architecture that does not necessarily exist in practice, as KPIs may essentially be a set of goals to be compared with a particular computer network.

KPI Weights

In step 102, weight values are associated with each KPI in order to provide additional significance to one or more groupings of KPIs.

TABLE 1

Infrastructure KPIs with Weights

| Infrastructure KPI | Level of Importance/Weight |
|---|---|
| Business Priority | 50 |
| Flexibility/Modularity | 50 |
| Availability | 50 |
| QoS/SLA | 20 |
| Operational Readiness | 20 |
| Standards Adherence/Governance | 20 |
| Scalability | 5 |
| Resiliency | 5 |
| Compliance | 5 |
| Robustness | 5 |
| Sustainability/Green | 5 |

Table 1 depicts one example of weights associated with a set of KPIs. In one embodiment, a particular weight value denotes a level of importance for a particular corresponding KPI with respect to the reference architecture (the entire set of KPIs) as a whole. Consequently, KPIs that have great influence in determining the readiness of an existing network to support converged features are associated with larger weight values, whereas KPIs having a lesser impact on the determination are associated with smaller weight values. Considering Table 1, Business Priority and Flexibility/Modularity are considered the most important KPIs and thus are each associated with weight values of 50. KPIs with weights of 20 and 5 are of middle tier and least importance, respectively, and indicate a lesser impact on the readiness determination as a whole. The weight values found in Table 1 are not meant to be limiting, as any distribution of weights could be used to provide additional relevance to KPIs. Further, an entity or administrator seeking assessment of a particular existing network may have their own specific interests related to KPIs, thus, weight values may vary based on any number of personal factors.

In other embodiments, additional aspects or sub-elements of each individual KPI may be associated with a different weight value to produce finer-grain weight values within each KPI. For example, considering the Operational Readiness application-related KPI in FIG. 4, 75% of the total Operational Readiness KPI could be attributed to evidence of an existing network's implementation of a failure reporting mechanism.

After generating a set of KPIs to represent a reference network architecture, information related to the performance of the existing network is gathered for comparison with the set of KPIs. Thus, in step 103, performance information is received for an existing network. The performance information is used for comparison with the KPIs generated in step 101, and thus should fully describe at least the portions of the existing network that correspond to the reference KPIs. Performance information received in step 103 may be collected from a variety of sources, such as network operators, administrators or engineers. Performance information may also be collected from various electronic components within the existing network, such as routers, switches, gateways, terminals, etc. Further, any method of retrieving performance information may be used including email or standard mail questionnaires provided to network operations personnel or electronic data mining of network hardware.

FIG. 5A, FIG. 5B illustrate one example of a questionnaire 500 for collecting infrastructure data related to WAN performance for a network. Questionnaire 500 may be just one questionnaire in any number of questionnaires or other data gathering means designed to extract performance information from those who are most knowledgeable about the network under assessment. Questionnaire 500 may be sent to and received from network operations personnel such as a network administrators, engineers and/or architects.

In an embodiment, a questionnaire identifies, for each KPI category 501, at least one sub-category 502, Questions 503, Level of Importance (weights) 504, Answers 505, and Notes 506. In other embodiments, questionnaire 500 may take any variety of forms and include any number of headings. However, the general goal of questionnaire 500 is to extract answers to very specific questions that reveal performance related information for each KPI. Thus, questions for each KPI and associated sub-category are direct and concise. Notes column 506 may provide an additional space for answering questions 503 when a single "yes" or "no" answer would be insufficient to answer the question.

In one embodiment, questionnaire 500 is received electronically through email, for example, and parsed to extract the relevant answers. In such an embodiment, it is advantageous to include leading (Yes/No) questions 503 to facilitate parsing of the questionnaire 500 for further processing related to comparison with the reference architecture.

Generation of Individual KPI Scores

Referring again to FIG. 1A, control is passed to step 104 where received performance information and weight values associated with each KPI are used to determine a score for each KPI. In one embodiment, received performance information is evaluated to calculate a score for each KPI category. Calculating a score for each KPI category includes using a weighted mean formula, such as, for example:

$$A = \frac{\sum_{i=0}^{i=n} Wi \times Xi}{\sum_{i=0}^{i=n} Wi} \qquad (1)$$

In Formula 1, a weighted mean A is calculated for each Sub-Category n in a KPI category, by summing the product of each category weight Wi and the corresponding category answer Xi (in this case Yes=1, No=0), and dividing by the sum of the weights. Using the Availability KPI category in FIG. 5A as an example, calculating the weighted mean according to Formula 1 first requires determining that there are 5 Yes answers and 1 No answer. Since the weight value in this case is fixed at 50, the resulting equation can be simplified to A=(5*50/6*50), or 0.83. This weighted mean may then be used as a KPI compliance percentage for the Availability KPI.

In one embodiment, each KPI compliance percentage is further grouped into one of three grades to generate one overall KPI percentage per KPI category. Grouping compliance percentages into grades may simplify calculation of an overall score for the entire existing network. For example, there may be three ranges of grades into which a KPI percentage may fall, as in example Formula 2:

$M=0\%$ {if $0<A\leq0.4$}

$50\%$ {if $0.4<A\leq0.8$}

$100\%$ {if $A>0.8$} \qquad (2)

Thus, using the weighted mean A calculated for the Availability KPI as described above, an overall KPI percentage M is 100%, as 0.83>0.80 evaluates to true. Again, in operation Formulas 1-2 are similarly applied for each KPI category, resulting in one grade for each KPI category. This first set of scores may then be used to generate a single overall score for the entire set of KPIs.

The embodiments described herein are not limited to the formulas as expressed herein. In other embodiments, any number of other formulas may be used to generate KPI percentage scores. Further, other embodiments may include non-fixed weight values within each KPI category to produce differentiated grading per KPI category.

Generation of Overall Score for Existing Network

In step 105, a single overall score is generated for the existing network architecture. In one embodiment, the single score represents an overall level of compliance with respect to the reference architecture (as defined by the KPIs). The single overall score may also indicate a level of readiness of the existing network to handle certain applications, services, infrastructure, or business aspects defined by one or more sets of KPIs. In one embodiment, the single overall KPI score is defined by example Formula 3:

$KPI_i = \alpha_1 \Sigma M_1 + \alpha_2 \Sigma M_2 + \alpha_3 \Sigma M_3,$ \qquad (3)

where $\alpha_1$=weight constant=0.50, $\alpha_2$=weight constant=0.20, and $\alpha_3$=weight constant=0.05, and $M_{1-3}$ are previously calculated overall KPI percentage grades per KPI category. Thus, an overall KPI score for the existing network architecture is the sum of all overall KPI percentages associated with a specific weight, multiplied by each respective associated weight.

FIG. 6 illustrates a detailed spreadsheet view of individual KPI scores grouped by weight (some of the previously described KPI categories are omitted for clarity). High influence KPIs (KPIs associated with weight of 50) 601 include Business Priority, Modularity and Availability KPI categories having individual KPI grades of 100, 100, and 100 respectively. Thus, calculating $\alpha_1 \Sigma M_1$ using Formula 3 equates to $(50/100)*(100+100+100)=150$. Similarly, calculating $\alpha_2 \Sigma M_2$ evaluates to $(20/100)*(50+100)=30$, and $\alpha_3 \Sigma M_3$ evaluates to $(5/100)*(100+50+50+0)=10$. The single overall score for the existing architecture is thus 150+30+10, or 190.

In one embodiment, an overall architecture score can be categorized into one of three grades, much like individual KPIs were graded using Formula 2. For example, a particular overall architecture score may be associated with a certain grade if the score is within a particular range of scores. Table 2, below, depicts one example of ranges that could be used for determining whether an existing network architecture's overall KPI score within certain grade ranges. Table 2 also associates each grade range with a color: Gold, Silver or Bronze. Further associating each rating with a color may aid an entity, seeking assessment of its existing network architecture, in understanding how the network under assessment compares with the reference architecture. Other embodiments may implement different grading schemes, and the embodiments disclosed herein are not limited to the example colors and grade ranges. Further, some embodiments may use letter and/or number grades in place of or in conjunction with a color grading scheme.

TABLE 2

Overall KPI Grading Rules

| Grade | Grading Rules |
|---|---|
| Gold | $KPI_i \geq 0.80*Max(KPI)$ |
| Silver | $0.40*Max(KPI) < KPI_i < 0.80*Max(KPI)$ |
| Bronze | $0.40*Max(KPI) \geq KPI_i$ |

The example grading rules of Table 2 compare the single overall score ($KPI_i$) with various percentages of Max(KPI). Max(KPI) is the highest possible single overall score an existing network could receive based on one or more sets of KPIs, their associated weights, and other intermediate grading rules. Using, for example, a Max(KPI)=200, the overall score from the previous examples of 190 would fall within the Gold grade range, which may indicate that an existing network has good standing with respect to readiness or overall compliance with the reference architecture. In other words, the existing network is likely ready to implement converged features, as defined by the KPIs, without substantial performance degradation or modification. Lower grade ranges, such as Silver and Bronze may indicate middle tier and poor compliance with the reference architecture, respectively.

Display of Comparison Results

Figure 2:
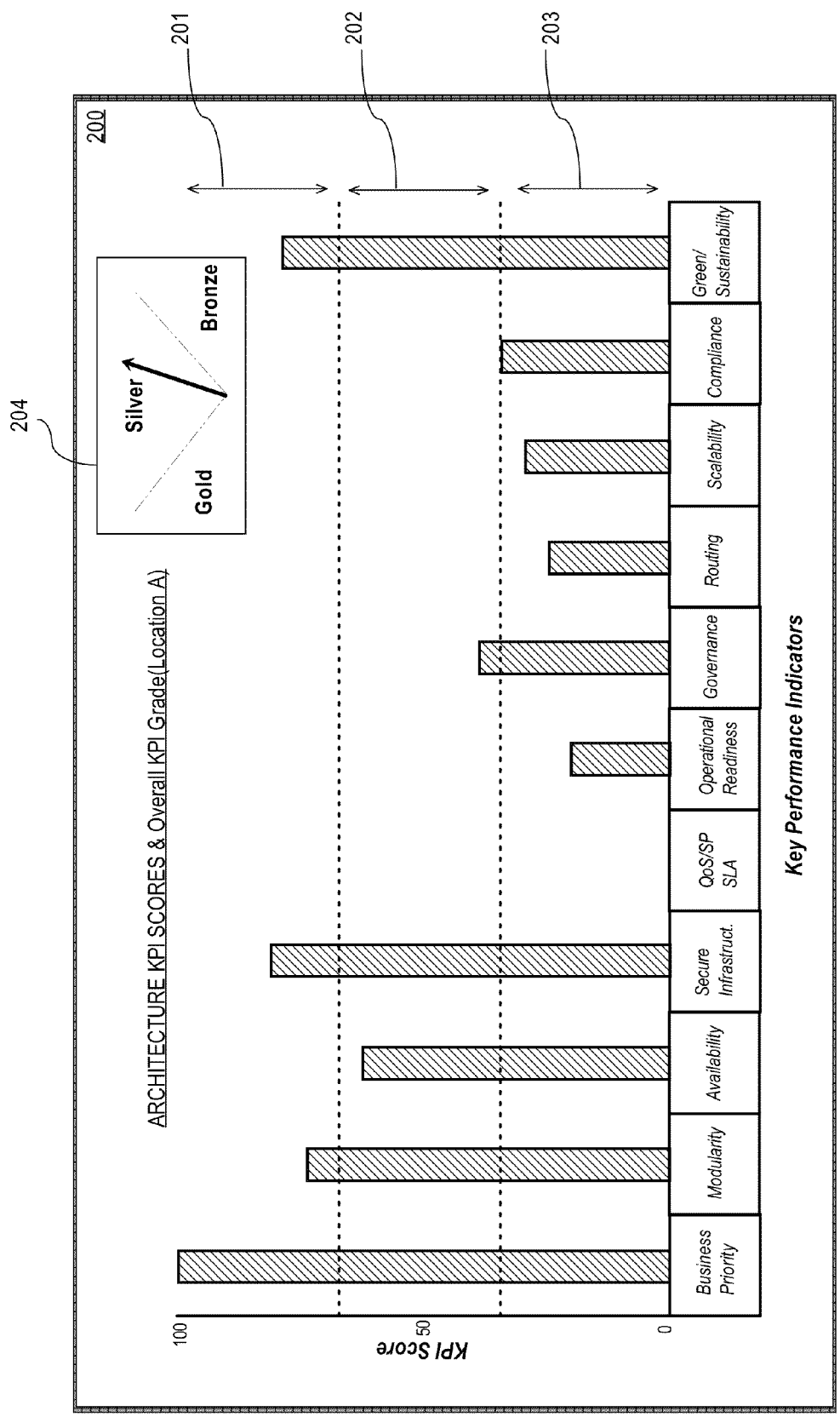
FIG. 2 illustrates one example of visual display of network assessment data.

In step 106, one or more of the first set of KPI percentage compliance scores, overall architecture score, received performance information, and KPIs are displayed in a graphical user interface. In FIG. 2, for example, a graphical user interface 200, such as display screen of a computer, may be used to display information that indicates how a given network architecture compares with a reference architecture. The single overall score and grade may provide the most direct indications of an existing network's readiness. However, the first set of scores which were used to derive the overall score, the received performance information, and KPIs are also beneficial in thoroughly understanding the meaning of the overall score and grade. Thus, in the embodiment illustrated in FIG. 2, graphical user interface 200 includes visual display of the grade 204, individual KPI scores (Y-axis), and the KPI categories (X-Axis).

Additionally, example graphical user interface 200 includes two dashed lines to indicate which of the KPI percentage scores fall within three overall KPI percentage grades 201, 202, 203. In this particular example, the grade 204 for the existing network is Silver which may indicate that improvements are required to support converged features defined by the KPIs.

In other embodiments, more or less detail may be displayed in graphical user interface 200. For example, received performance data, details regarding each KPI and/or any weight values used in calculating KPIs may also be displayed concurrently or in place of data displayed in FIG. 2. Additionally, graphical user interface 200 may include KPI scores or grades for a plurality of geographic locations or "sites," and provide a means for visually comparing scores derived from the plurality of sites.

In one embodiment, the method 100 described herein is applied to multiple different existing or transformative networks such that each assessed network is associated with a corresponding set of performance information, individual KPI scores and overall score and/or grade. At least a portion of the resulting information associated with each network may then be visually displayed in a graphical user interface for comparison across network types. In assessing multiple networks it is beneficial to use the same reference architecture (KPIs) to ensure meaningful comparison.

Remediation

In one embodiment, remediation data may be generated for an existing network after comparison with a reference architecture. Remediation data may specify one or more steps that could be used to improve an existing network's readiness with respect to a set of KPIs used in the comparison of the architectures.

For example, remediation data may include an assessment report, slideshow presentation, graphs or charts, that indicate how the existing network can be modified to better coincide with a set of KPIs. A timeline or "roadmap" may be generated to identify a time period for executing step-by-step remedial measures to repair existing network deficiencies. Further, in embodiments including weight values, a roadmap may be prioritized to specify remediation of high importance (e.g., large weight values) KPIs before less important KPIs.

Converged Network Assessment Computing Device

FIG. 1B illustrates an automated embodiment in a network context. Generally, FIG. 1B comprises existing network 107, network personnel 110, assessment device 111 and remediation data 120.

Existing network 107 represents a converged network under assessment by assessment device 111. Existing network 107 is comprised of one or more infrastructure modules 108 and application or service modules 109. Any combination of one or more local networks, wide area networks, internetworks or service providers may be located in the path between assessment device 111 and existing network 107 however these items are omitted for clarity.

Network personnel 110 are persons having knowledge of infrastructure and application-service modules 108, 109 associated with existing network 107. Network personnel 110 may communicate with assessment device 111 via existing network 107 or any other network. In one embodiment, assessment device 111 is comprised of one or more processors coupled to one or more memories, configured to execute instructions to perform the method 100 as described in relation to FIG. 1. Finally, remediation data 120 may be comprised of a report or roadmap timeline to be delivered or displayed via display device 119 coupled to assessment device 119.

The method 100 as described with respect to FIG. 1A may be automated such that generation of KPIs, collection of performance data, generation of scores and display or output of remediation and report data are all performed within assessment device 111. Sets of KPIs may be grouped as infrastructure-related KPIs 115a and application or service-related KPIs 115b and assessment device 111 may store and facilitate generation of KPIs 115a,b and any associated weights for comparison processing using data analysis unit 116.

In an embodiment, assessment device 111 is configured for communicating with existing network 107 to extract performance information associated with the existing network 107. More specifically, assessment device 111 communicates directly with infrastructure modules 108 and application modules 109, and receives and locally stores infrastructure and application performance information 113, 114. In other embodiments, assessment device 111 may receive performance information via an intermediary device such as a server computer that is configured to collect performance information from modules in existing network 107.

In one embodiment performance information may also be received from knowledgeable network personnel 110, such as network engineers or administrators. For example, assessment device 111 may receive questionnaire data 112a or spreadsheet data 112b from network personnel 110 for automated parsing and comparison in data analysis unit 116.

Once KPIs 115a, 115b are generated and the relevant performance information is received, data analysis unit 116 performs comparison of KPIs 115a, 115b and the received performance information 113, 114. Based on the comparison, individual KPI scores and overall score(s) and grade(s) are generated by data analysis unit 116. Data analysis unit 116 may be preprogrammed with instructions for executing Formulas 1-3 (as listed above) in order to generate scores. However, any other suitable logic may be used to generate such scores. Further, data analysis unit 116 may generate and locally store converged network architecture readiness assessment data 117 based on the individual KPI scores and overall score(s) and grade(s). Such data may be formatted for output as remediation data 120, including a timeline for modifying the existing network 107 and/or general assessment data indicating the results of the architectural comparison.

Assessment device 111 may also include a dashboard metric generating unit 118 for generating visual display of the readiness data 117, such as charts, graphs or slides. FIG. 2 is one example of a visual rendition of readiness data 117 which may be generated by dashboard metric generating unit 118. Dashboard metric generating unit 118 may be directly coupled to a display device located on or near the assessment device, however, in other embodiments display device 119 may be a display coupled to a remote computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
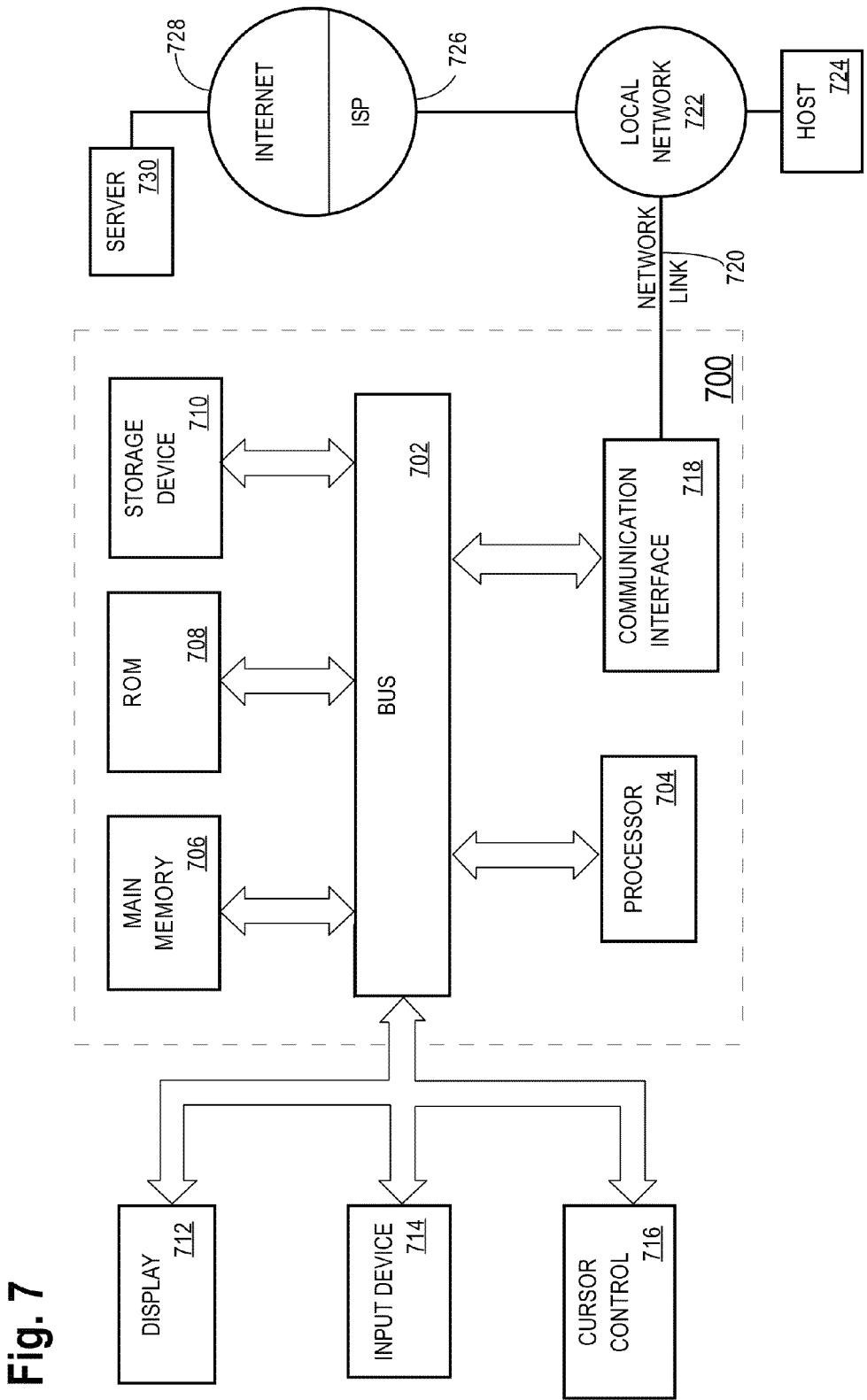
FIG. 7 illustrates one example of a computer system on which embodiments of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   using a computing device, receiving performance information associated with performance of one or more network infrastructure elements and one or more application elements or service elements of a computer network;
   using the computing device, comparing one or more performance indicators of a reference network architecture with at least a portion of the performance information;
   using the computing device, determining a plurality of first scores for the performance information, wherein each score of the first scores is based, at least in part, on the comparing;
   using the computing device, determining, based on the plurality of first scores, a single second score that indicates a converged state of the computer network as a whole in readiness to process video, voice and data with respect to the reference network architecture, and that indicates a level of readiness of the computer network as a whole to support the one or more application elements or the service elements of the computer network on the one or more network infrastructure elements in processing the video, voice and data;
   wherein the method is performed by one or more computing devices.

2. The method of claim 1, further comprising:
   associating a weight value, of one or more weight values, with each of the one or more key performance indicators;
   wherein each first score of the plurality of first scores is based, at least in part, on a particular weight value, of the one or more weight values, associated with a particular key performance indicator, of the one or more key performance indicators.

3. The method of claim 2, further comprising displaying, in a graphical user interface, at least a portion of the plurality of first scores and at least a portion of the performance information.

4. The method of claim 3, wherein the one or more weight values indicate a priority level for an associated key performance indicator, and displaying one or more of the plurality of first scores includes displaying a set of the plurality of first scores corresponding to a particular priority level.

5. The method of claim 1, further comprising generating, based at least in part on one or more of the plurality of first scores and the second score, remediation report data that indicates how the computer network can be modified to match the one or more key performance indicators of the reference network architecture.

6. The method of claim 1, wherein the performance information, received for the computer network, includes both application layer performance information, physical infrastructure performance information, and one or more of: regulatory compliance information and operational cost efficiency information.

7. The method of claim 1, wherein determining the single second score includes classifying, based on the plurality of first scores, the computer network into a particular category of a plurality of graduated categories that indicate an ability of the computer network to support a particular set of network services.

8. The method of claim 1, wherein the one or more key performance indicators include one or more application layer network readiness criteria and one or more physical network infrastructure readiness criteria.

9. The method of claim 3, further comprising displaying, in the graphical user interface, at least a portion of the plurality of first scores, at least a portion of the performance information, and the single second score.

10. The method of claim 1, further comprising:
receiving second performance information associated with performance of a second computer network for which a performance assessment is desired;
determining a plurality of second scores for the second performance information, wherein each score of the plurality of second scores is based, at least in part, on comparing the one or more key performance indicators that represent the reference network architecture with at least a portion of the second performance information;
determining, based on the plurality of second scores, a single third score that indicates a state of the second computer network with respect to the reference network architecture;
displaying, in a graphical user interface, one or more of: the one or more key performance indicators, at least a portion of the plurality of first scores, at least a portion of the plurality of second scores, the single second score, and the single third score.

11. A non-transitory computer-readable storage medium storing one or more sequences of instructions which, when executed by one or more processors, cause the one or more processors to perform:
receiving performance information associated with performance of a network architecture;
determining a plurality of first scores for the performance information, wherein each score of the plurality of first scores is based, at least in part, on comparing one or more key performance indicators that represent a reference network architecture with at least a portion of the performance information;
determining, based on the plurality of first scores, a second score that indicates a converged state of the network architecture as a whole in readiness to process video, voice and data with respect to the reference network architecture, and that indicates a level of readiness of the network architecture as a whole to support one or more application elements or service elements of the network architecture in processing the video voice and data.

12. The non-transitory computer-readable storage medium of claim 11, further comprising instructions for carrying out the steps of:
associating a weight value, of one or more weight values, with each of the one or more key performance indicators;
wherein each first score of the plurality of first scores is based, at least in part, on a particular weight value, of the one or more weight values, associated with a particular key performance indicator, of the one or more key performance indicators.

13. The non-transitory computer-readable storage medium of claim 12, further comprising instructions for carrying out the steps of:
displaying, in a graphical user interface, at least a portion of the plurality of first scores and at least a portion of the performance information.

14. The non-transitory computer-readable storage medium of claim 13, wherein the one or more weight values indicate a priority level for an associated key performance indicator, and displaying one or more of the plurality of first scores includes displaying a set of the plurality of first scores corresponding to a particular priority level.

15. The non-transitory computer-readable storage medium of claim 11, further comprising instructions for carrying out the steps of:
generating, based at least in part on one or more of the plurality of first scores and the second score, information that indicates how the network architecture can be improved to match the one or more key performance indicators of the reference network architecture.

16. The non-transitory computer-readable storage medium of claim 11, wherein the performance information, received for the network architecture includes both application layer performance information, physical infrastructure performance information, and one or more of: regulatory compliance information and operational cost efficiency information.

17. The non-transitory computer-readable storage medium of claim 16, wherein determining the second score includes classifying, based on the plurality of first scores, the network architecture into a graduated category of a plurality of graduated categories that indicate an ability of the network architecture to support a particular set of network services.

18. The non-transitory computer-readable storage medium of claim 11, wherein the one or more key performance indicators include one or more application layer network readiness indicators and one or more physical network infrastructure readiness indicators.

19. The non-transitory computer-readable storage medium of claim 13, further comprising instructions for carrying out the steps of:
displaying, in the graphical user interface, at least a portion of the plurality of first scores, at least a portion of the performance information, and the second score.

20. The non-transitory computer-readable storage medium of claim 11, further comprising instructions for carrying out the steps of:
receiving a plurality of second performance information associated with performance of a second network architecture;
determining a plurality of second scores for the second performance information, wherein each score of the plurality of second scores is based, at least in part, on comparing the one or more key performance indicators that represent the reference network architecture with at least a portion of the plurality of second performance information;
determining, based on the plurality of second scores, a third score that indicates the state of the second network architecture with respect to the reference network architecture;
displaying, in a graphical user interface, one or more of: the one or more key performance indicators, at least a portion of the plurality of first scores, at least a portion of the plurality of second scores, the second score, and the third score.

* * * * *